(12) United States Patent
Muramatsu

(10) Patent No.: US 8,412,266 B2
(45) Date of Patent: Apr. 2, 2013

(54) PORTABLE TERMINAL DEVICE, IMAGE DISPLAY SYSTEM, IMAGE DISPLAY METHOD, AND COMPUTER-READABLE STORAGE MEDIUM

(75) Inventor: Eiji Muramatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 130 days.

(21) Appl. No.: 13/124,682

(22) PCT Filed: Nov. 26, 2009

(86) PCT No.: PCT/JP2009/069955
§ 371 (c)(1),
(2), (4) Date: Apr. 18, 2011

(87) PCT Pub. No.: WO2010/061889
PCT Pub. Date: Jun. 3, 2010

(65) Prior Publication Data
US 2011/0218019 A1 Sep. 8, 2011

(30) Foreign Application Priority Data
Nov. 26, 2008 (JP) .................. 2008-300539

(51) Int. Cl.
*H04M 1/00* (2006.01)
(52) U.S. Cl. .............. 455/556.1; 455/41.3; 455/507
(58) Field of Classification Search .......... 455/556.1, 455/557, 566, 90.1–90.2, 41.1–41.3, 507, 455/66.1; 382/312
See application file for complete search history.

(56) References Cited

U.S. PATENT DOCUMENTS 8,090,402 B1 * 1/2012 Fujisaki ............... 455/556.1
2010/0046842 A1 * 2/2010 Conwell ............... 382/218

FOREIGN PATENT DOCUMENTS

| JP | 2004171528 A | 6/2004 |
| JP | 2005176235 A | 6/2005 |
| JP | 2006295255 A | 10/2006 |
| JP | 2007052646 A | 3/2007 |
| JP | 2007094518 A | 4/2007 |
| JP | 2009246767 A | 10/2009 |

OTHER PUBLICATIONS

International Search Report for PCT/JP2009/069955 mailed Dec. 22, 2009.

* cited by examiner

*Primary Examiner* — Christian Hannon

(57) ABSTRACT

An image data obtaining unit (102) obtains image data picked up by an image-pickup device. An identification information obtaining unit (101) obtains identification information of a device that is wirelessly communicated when the image data is obtained. An image data memory unit (104) stores, in association with each other, the obtained image data and the identification information obtained when the image data is obtained. The identification information obtaining unit (101) obtains the identification information of the device wirelessly communicated at a predetermined timing after the image data memory unit (104) stores the image data and the identification information in association with each other. A searching unit (106) searches image data associated with the obtained identification information among pieces of the image data stored in the image data memory unit (104). A display control unit (107) displays the searched image data on a display unit.

9 Claims, 6 Drawing Sheets

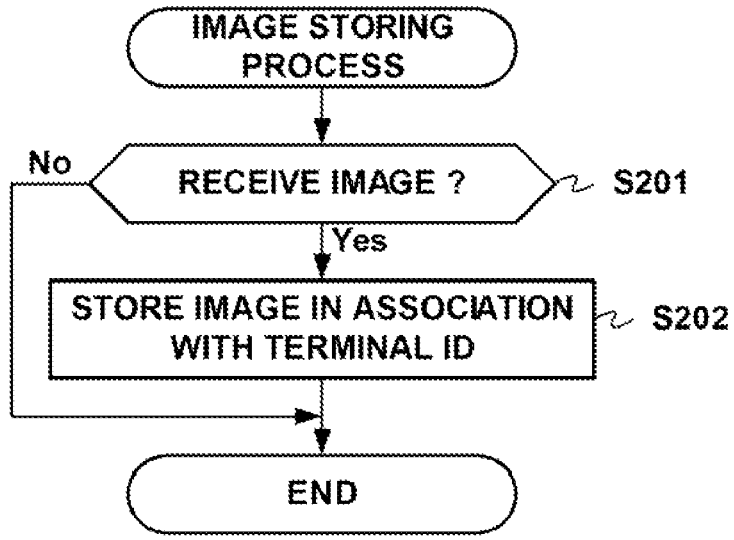
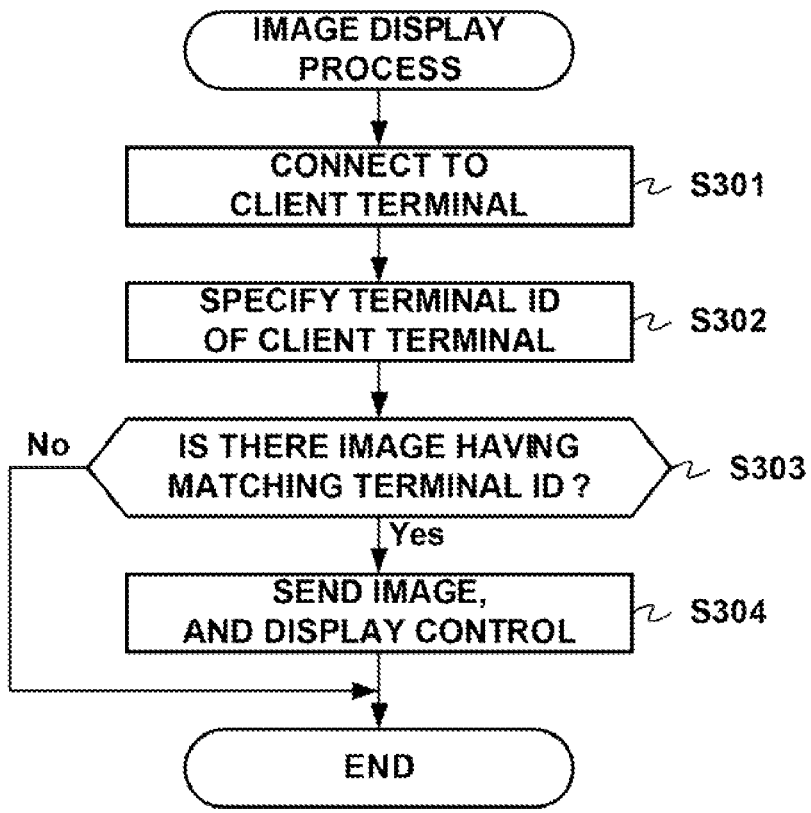

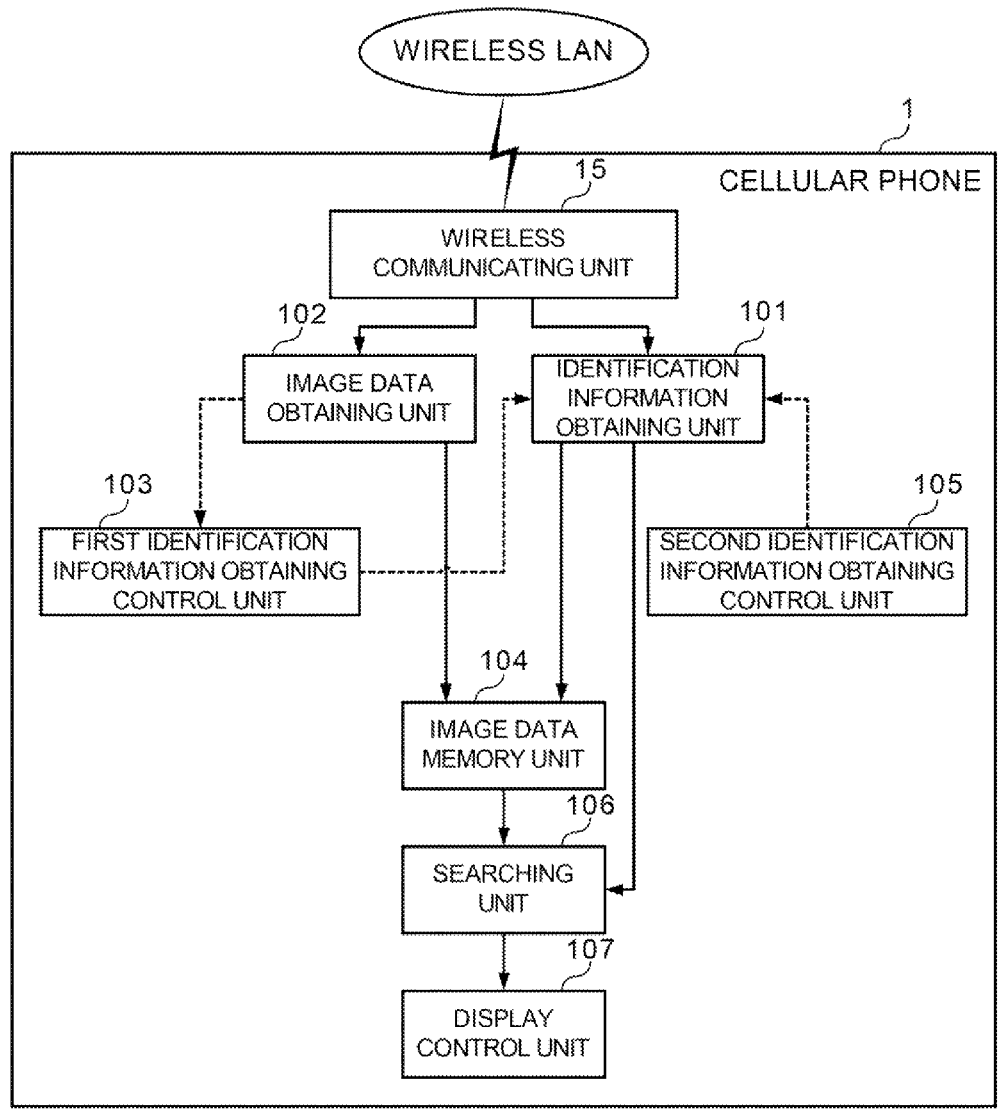

Fig.9

| IMAGE DATA | TERMINAL ID |
|:---:|:---:|
| IMAGE A | 1007, 1010 |
| IMAGE B | 1002, 1003 |
| IMAGE C | 1005 |
| IMAGE D | 1002, 1003 |
| IMAGE E | 1005, 1015 |
| IMAGE F | 1008 |
| ⋮ | ⋮ |

PORTABLE TERMINAL DEVICE, IMAGE DISPLAY SYSTEM, IMAGE DISPLAY METHOD, AND COMPUTER-READABLE STORAGE MEDIUM

TECHNICAL FIELD

The present invention relates to a portable terminal device, an image display system, an image display method, and a computer-readable storage medium.

BACKGROUND ART

Recently, the memory capacity of a digital camera, etc., remarkably increases. The increase of the memory capacity enables a digital camera to store a large amount of image data in a memory. On the other hand, an operation and a time needed for a user to search a desired image also increases together with the increase of the memory capacity.

Accordingly, when, for example, the user searches a desired image from a large amount of image data in the memory, the user needs to display large pieces of image data on the liquid crystal display of the digital camera and to visually check those pieces of image data.

An example of a technology that makes such checking easy, patent literature 1 discloses an image-pickup system. According to this image-pickup system, image data picked up by a digital camera is sent to a monitor device for image checking through a wireless LAN and is displayed on the monitor device.

PRIOR ART DOCUMENTS

Patent Literature

Patent Literature 1: Unexamined Japanese Patent Application KOKAI Publication No. 2006-295255

DISCLOSURE OF INVENTION

Problem to be Solved by the Invention

Even though the image-pickup system disclosed in patent literature 1 is used, however, it is necessary for the user to visually check a large number of images, and thus an operation and a time needed to search a desired image are still left largely.

Moreover, when a photographic system disclosed in patent literature 1 is used, although a desired image can be searched by plural people viewing images displayed on the monitor device, there is a possibility that unrelated images to those people viewing are displayed.

The present invention has been made in view of the above-explained circumstances, and it is an object of the present invention to provide a portable terminal device, an image display system, an image display method, and a computer-readable storage medium which enable a user to easily search a desired image among picked-up images.

Means for Solving the Problem

To achieve the foregoing object, a portable terminal device according to a first aspect of the present invention comprises: a wireless communicating unit that wirelessly communicates with at least a device; an identification information obtaining unit that obtains identification information of the device wirelessly communicated with the wireless communicating means; an image data obtaining unit that obtains image data picked up by an image-pickup device among devices wirelessly communicated with the wireless communicating means; a first identification information obtaining control unit that causes the identification information obtaining unit to obtain the identification information when the image data is obtained by the image data obtaining means; an image data memory unit that stores, in association with each other, the image data obtained by the image data obtaining unit and the identification information obtained under a control of the first identification information obtaining control unit when the image data is obtained; a second identification information obtaining control unit that causes the identification information obtaining unit to obtain the identification information at a predetermined timing after the image data memory unit stores the image data and the identification information in association with each other; a searching unit that searches image data associated with the identification information obtained under a control of the second identification information obtaining control unit among pieces of the image data stored in the image data memory means; and a display control unit that displays the image data searched by the searching unit on a display unit.

A portable terminal device according to a second aspect of the present invention comprises: a wireless communicating unit that wirelessly communicates with at least a device; an identification information obtaining unit that obtains identification information of the device wirelessly communicated with the wireless communicating means; an image data obtaining unit that obtains image data by picking up an image of an object; a first identification information obtaining control unit that causes the identification information obtaining unit to obtain the identification information when the image data is obtained by the image data obtaining means; an image data memory unit that stores, in association with each other, the image data obtained by the image data obtaining unit and the identification information obtained under a control of the first identification information obtaining control unit when the image data is obtained; a second identification information obtaining control unit that causes the identification information obtaining unit to obtain the identification information at a predetermined timing after the image data memory unit stores the image data and the identification information in association with each other; a searching unit that searches image data associated with the identification information obtained under a control of the second identification information obtaining control unit among pieces of the image data stored in the image data memory means; and a display control unit that displays the image data searched by the searching unit on a display unit.

An image display system according to a third aspect of the present invention includes a plurality of portable terminal devices and a digital camera, a main portable terminal device that is a portable terminal device among the plurality of portable terminal devices being connected to at least one of the other portable terminal devices and the digital camera through a wireless communication, wherein the main portable terminal device comprises: a wireless communicating unit that wirelessly communicates with at least one of the other portable terminal devices and the digital camera; an identification information obtaining unit that obtains identification information of the portable terminal device wirelessly communicated with the wireless communicating means; an image data obtaining unit that obtains image data picked up by the digital camera wirelessly communicated with the wireless communicating means; a first identification information obtaining control unit that causes the identification information obtaining unit to obtain the identification information when the image data is obtained by the image data obtaining means; an image data memory unit that stores, in association with each other, the image data obtained by the image data obtaining unit and the identification information obtained under a control of the first identification information obtaining control unit when the image data is obtained; a second identification information obtaining control unit that causes the identification information obtaining unit to obtain the identification information at a predetermined timing after the image data memory unit stores the image data and the identification information in association with each other; a searching unit that searches image data associated with the identification information obtained under a control of the second identification information obtaining control unit among pieces of the image data stored in the image data memory means; and a display control unit that displays the image data searched by the searching unit on a display unit.

An image display method according to a fourth aspect of the present invention includes: an image data obtaining step in which a portable terminal device obtains image data picked up by an image-pickup device among devices connected to the portable terminal device through a wireless communication; a first identification information obtaining step in which the portable terminal device obtains identification information of a device connected to the portable terminal device through a wireless communication when the image data is obtained in the image data obtaining step; an image data recording step in which the portable terminal device stores, in a memory unit in association with each other, the image data obtained in the image data obtaining step and the identification information obtained in the first identification information obtaining step when the image data is obtained; a second identification information obtaining step in which the portable terminal device obtains the identification information of a device connected to the portable terminal device through a wireless communication at a predetermined timing after the image data and the identification information are stored in the memory unit in association with each other in the image data memory step; a searching step in which the portable terminal device searches image data associated with the identification information obtained in the second identification information obtaining step among pieces of the image data stored in the memory unit in the image data memory step; and a display control step in which the portable terminal device causes a display unit to display image data searched in the searching step.

A computer-readable storage medium according to a fifth aspect of the present invention stores a program for allowing a computer to function as: a wireless communicating unit that wirelessly communicates with at least a device; an identification information obtaining unit that obtains identification information of the device wirelessly communicated with the wireless communicating means; an image data obtaining unit that obtains image data picked up by an image-pickup device among devices wirelessly communicated with the wireless communicating means; an first identification information obtaining control unit that causes the identification information obtaining unit to obtain the identification information when the image data is obtained by the image data obtaining means; an image data memory unit that stores, in association with each other, the image data obtained by the image data obtaining unit and the identification information obtained under a control of the first identification information obtaining control unit when the image data is obtained; a second identification information obtaining control unit that causes the identification information obtaining unit to obtain the identification information at a predetermined timing after the image data memory unit stores the image data and the identification information in association with each other; a searching unit that searches image data associated with the identification information obtained under a control of the second identification information obtaining control unit among pieces of the image data stored in the image data memory means; and a display control unit that causes a display unit to display the image data searched by the searching unit.

Effect of the Invention

According to the present invention, a user becomes able to easily search a desired image among picked-up images.

BRIEF DESCRIPTION OF DRAWINGS

FIG. 6 is a flowchart showing an illustrative operation of an image saving process by the cellular phone;

FIG. 7 is a flowchart showing an illustrative operation of an image display process by the cellular phone;

FIG. 8 is a block diagram showing an illustrative functional configuration of the cellular phone: and FIG. 9 is a diagram showing an illustrative data structure of an image data memory unit that stores image data and identification information in association with each other.

BEST MODE FOR CARRYING OUT THE INVENTION

An explanation will now be given of an image display system 100 according to an embodiment of the present invention with reference to the accompanying drawings.

Figure 1:
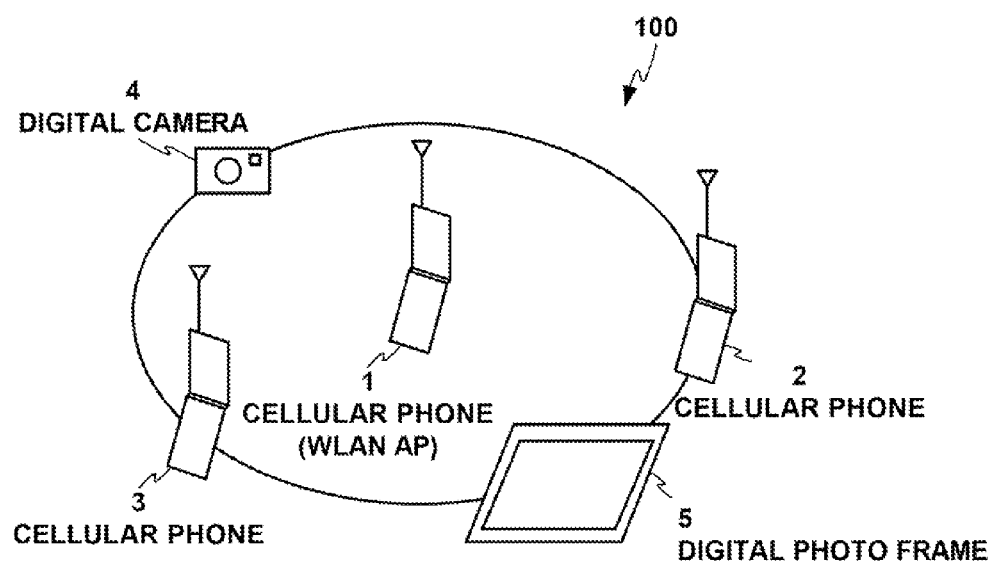
FIG. 1 is a diagram showing an illustrative configuration of an image display system according to an embodiment of the present invention.

FIG. 1 is a diagram showing an illustrative configuration of the image display system 100.

As shown in FIG. 1, the image display system 100 includes cellular phones 1, 2, and 3 which are portable terminal devices (communication devices), a digital camera 4, and a digital photo frame 5. The cellular phone 1 is connected to the cellular phones 2 and 3, the digital camera 4, and the digital photo frame 5 through a close-range wireless communication.

An explanation will be given of an example case in which the image display system 100 is connected through a wireless LAN (Local Area Network) that is an example of the close-range wireless communication. Moreover, in the image display system 100, the cellular phone 1 among the cellular phones 1 to 3 serves as a wireless LAN access point (WLAN_AP).

Figure 2:
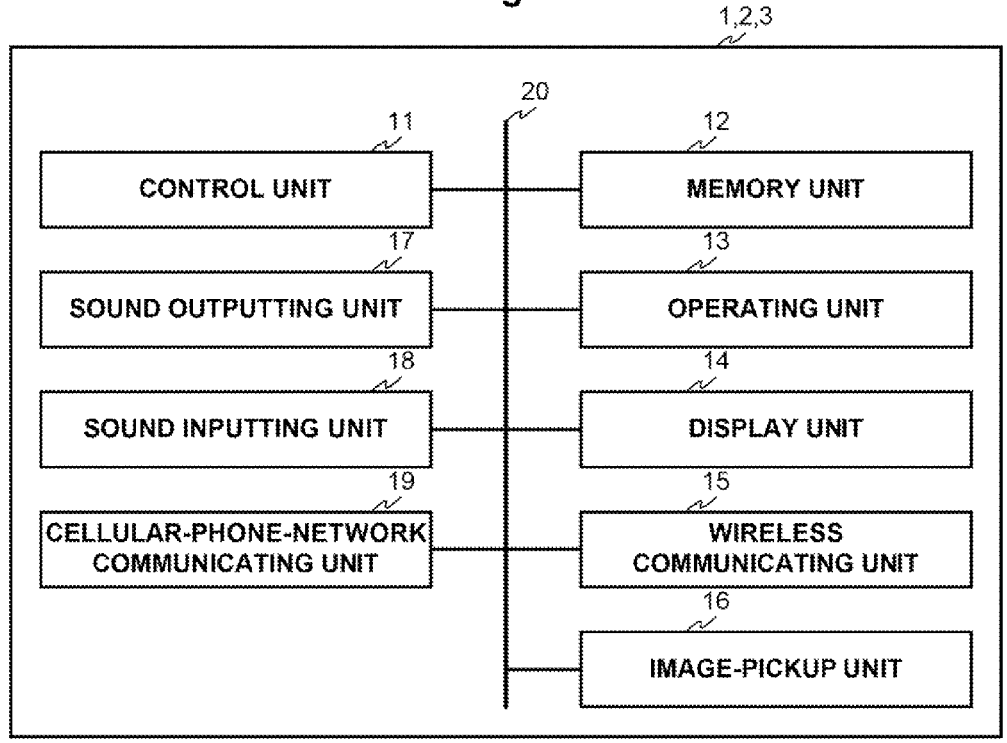
FIG. 2 is a block diagram showing an illustrative configuration of a cellular phone.

FIG. 2 is a block diagram showing an illustrative configuration of the cellular phones 1 to 3.

As shown in FIG. 2, the cellular phones 1 to 3 each include a control unit 11, a memory unit 12, an operating unit 13, a display unit 14, a wireless communicating unit 15, an image-pickup unit 16, a sound outputting unit 17, a sound inputting unit 18, a cellular-phone-network communicating unit 19, and a bus 20.

The control unit 11 comprises a microprocessor unit, etc. The control unit 11 controls the whole operation of each of the cellular phones 1 to 3.

In particular, the control unit 11 of the cellular phone 1 performs a control for realizing an access point function of the wireless LAN and a router function thereof. That is, the control unit 11 of the cellular phone 1 executes processes which are particular operations in the embodiment of the present invention and shown in FIGS. 5 to 7 to be discussed later.

The memory unit 12 stores various kinds of data. The memory unit 12 comprises a RAM (Random Access Memory) that serves as a work area, a ROM (Read Only Memory) that stores an operation program of each of the cellular phones 1 to 3, etc. Moreover, the memory unit 12 may be either one of an internal memory built in each of the cellular phones 1 to 3 and an external memory detachable from each of the cellular phones 1 to 3.

In particular, the memory unit 12 of the cellular phone 1 stores a program for realizing the access point function of the wireless LAN and the router function thereof. That is, the memory unit 12 of the cellular phone 1 stores a program corresponding to processes shown in FIGS. 5 to 7 to be discussed later.

The operating unit 13 comprises a keyboard, a cursor key, etc., provided at the exterior surface of each of the cellular phones 1 to 3. The operating unit 13 inputs an operation signal corresponding to operation of the keyboard, the cursor key, etc., to the control unit 11.

The display unit 14 comprises a display panel, a driver circuit, etc. The display panel comprises a dot-matrix type LCD (Liquid Crystal Display) panel or the like. The display unit 14 displays an image on the display panel under the control of the control unit 11.

The wireless communicating unit 15 communicates with an external device through the wireless LAN (WLAN). More specifically, the cellular phones 1 to 3 are connected one another through respective wireless communicating units 15. Moreover, the cellular phone 1 is connected to the digital camera 4 and to the digital photo frame 5 through the wireless communicating unit 15.

The image-pickup unit 16 comprises a lens, a shutter, an image-pickup element, and an analog/digital converter, etc. The image-pickup element is, for example, a CCD (Charge Coupled Device), or a CMOS (Complementary Metal Oxide Semiconductor). The analog/digital converter converts an electric signal (an analog signal) having undergone a photo-electric conversion by the image-pickup sensor to digital data.

The image-pickup unit 16 picks up an object image based on a signal for instructing storing of a picked-up image from the control unit 11. The picked-up image is stored in the memory unit 12. The image-pickup unit 16 may be capable of shooting a motion image. Moreover, when only the digital camera 4 is caused to pick up an image, it is fine if each of the cellular phones 1 to 3 does not include the image-pickup unit 16.

The sound outputting unit 17 comprises a speaker, and a DAC (Digital Analog Converter), etc. The sound outputting unit 17 performs D/A conversion on, for example, a sound signal received by the cellular-phone-network communicating unit 19, and outputs a sound from the speaker.

The sound inputting unit 18 collects sound signals during, for example, a phone call and supplies those collected sound signals to the cellular-phone-network communicating unit 19.

The cellular-phone-network communicating unit 19 exchanges a call sound, and various kinds of data, etc., with an external device through a base station of a cellular phone network.

The bus 20 is used for making individual units in each of the cellular phones 1 to 3 to mutually transmit data.

Figure 3:
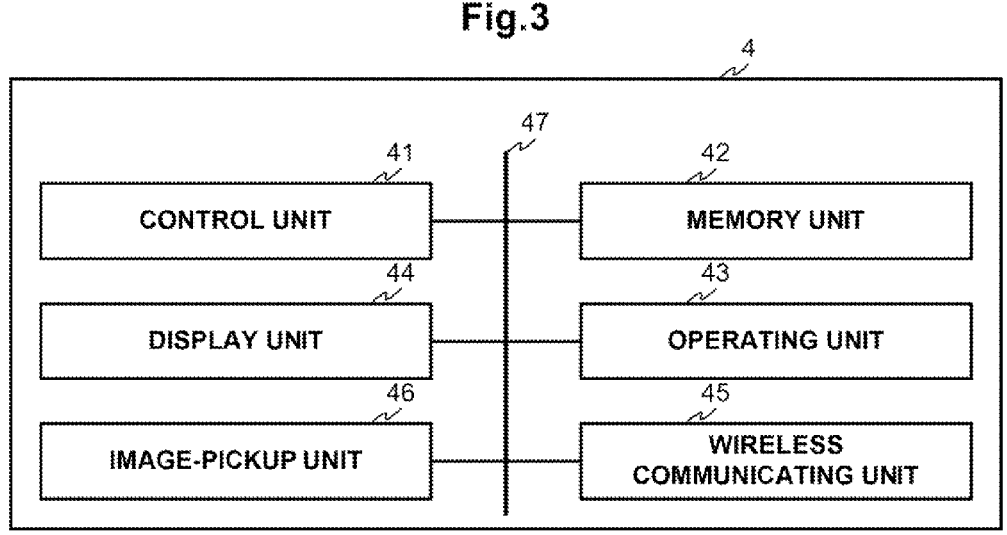
FIG. 3 is a block diagram showing an illustrative configuration of a digital camera.

FIG. 3 is a block diagram showing an illustrative configuration of the digital camera 4.

As shown in FIG. 3, the digital camera 4 includes a control unit 41, a memory unit 42, an operating unit 43, a display unit 44, a wireless communicating unit 45, an image-pickup unit 46, and a bus 47.

The control unit 41 comprises a microprocessor unit, etc. The control unit 41 controls the whole operation of the digital camera 4.

More specifically, under the control of the control unit 41, the image-pickup unit 46 picks up an image in response to an operation of, for example, a shutter key included in the operating unit 43 and generates image data. The generated image data is stored in the memory unit 42.

The memory unit 42 stores various kinds of data. The memory unit 42 comprises a RAM (Random Access Memory) that serves as a work area, and a ROM (Read Only Memory) that stores an operation program of the digital camera 4, etc. Moreover, the memory unit 42 may be either one of an internal memory built in the digital camera 4 and an external memory detachable from the digital camera 4.

The operating unit 43 comprises the shutter key, and a cursor key, etc., which are provided at the external face of the digital camera 4. The operating unit 43 inputs an operation signal corresponding to an operation of the shutter key, and the cursor key, etc., to the control unit 41.

The display unit 44 comprises a display panel, and a driver circuit, etc. The display panel comprises a dot-matrix type LCD (Liquid Crystal Display) panel or the like. The display unit 44 displays picked-up image data, etc., on the display panel under the control of the control unit 41.

The wireless communicating unit 45 communicates with an external device through the wireless LAN (WLAN). More specifically, the digital camera 4 is connected to the cellular phone 1, and the digital photo frame 5, etc., through the wireless communicating unit 45.

The image-pickup unit 46 comprises a lens, a shutter, an image-pickup element, and an analog/digital converter, etc. The image-pickup element is, for example, a CCD (Charge Coupled Device) or a CMOS (Complementary Metal Oxide Semiconductor). The analog/digital converter converts an electric signal (an analog signal) having undergone a photo-electric conversion by the image-pickup element to digital data.

The image-pickup unit 46 picks up an object image based on a signal for instructing storing of a picked-up image from the control unit 41. The picked-up image is stored in the memory unit 42. The image-pickup unit 46 may be capable of taking a motion image.

The bus 47 is used for making individual units in the digital camera 4 to mutually transmit data.

As explained above, the digital camera 4 is a digital camera having a wireless communication function through the wireless LAN.

Figure 4:
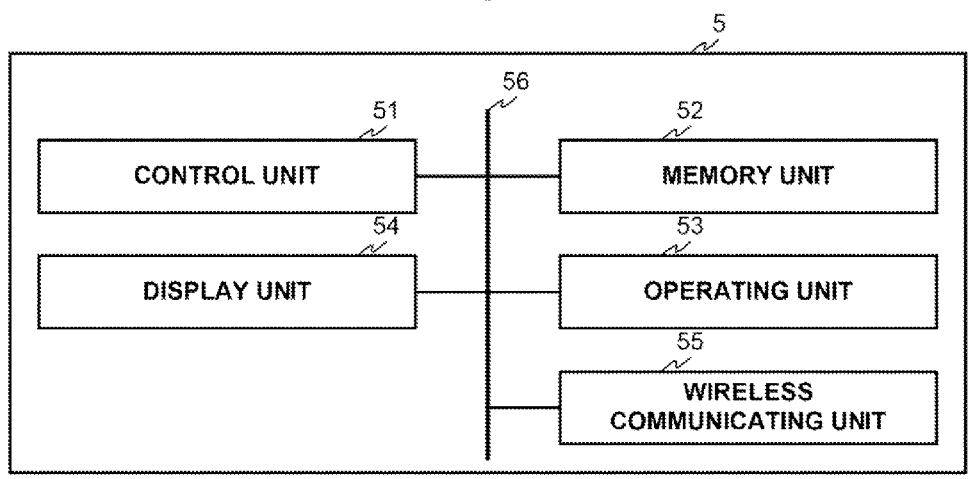
FIG. 4 is a block diagram showing an illustrative configuration of a digital photo frame.

FIG. 4 is a block diagram showing an illustrative configuration of the digital photo frame 5.

As shown in FIG. 4, the digital photo frame 5 includes a control unit 51, a memory unit 52, an operating unit 53, a display unit 54, a wireless communicating unit 55, and a bus 56.

The control unit 51 comprises, for example, a microprocessor unit. The control unit 51 controls the whole operation of the digital photo frame 5.

In particular, the control unit 51 controls a display function of the digital photo frame 5. More specifically, the control unit 51 causes the display unit 54 to display image data stored in the memory unit 52 and image data received by the wireless communicating unit 55. The control unit 51 may perform slide-show display of displaying plural pieces of the image data in series in accordance with a setting given by a user.

The memory unit 52 stores various kinds of image data, etc. The memory unit 52 comprises a RAM (Random Access Memory) that serves as a work area, and a ROM (Read Only Memory) that stores an operation program of the digital photo frame 5, etc. Moreover, the memory unit 52 may be either one of an internal memory built in the digital photo frame 5 and an external memory detachable from the digital photo frame 5.

The operating unit 53 comprises an operation button and the like provided at the external face of the digital photo frame 5. The operating unit 53 inputs an operation signal corresponding to an operation of the operation button, etc., to the control unit 51.

The display unit 54 comprises a display panel, and a driver circuit, etc. The display panel comprises a dot-matrix type LCD (Liquid Crystal Display) panel or the like. The display unit 54 displays image data and the like stored in the memory unit 52 on the display panel under the control of the control unit 51.

The wireless communicating unit 55 communicates with an external device through the wireless LAN (WLAN). More specifically, the digital photo frame 5 is connected to the cellular phone 1, and the digital camera 4, etc., through the wireless communicating unit 55.

The bus 56 is used for making individual units in the digital photo frame 5 to mutually transmit data.

Next, an operation of the image display system 100 having the above-explained configuration will be explained which mainly focuses on an operation of the cellular phone 1 with reference to FIGS. 5 to 7.

Figure 5:
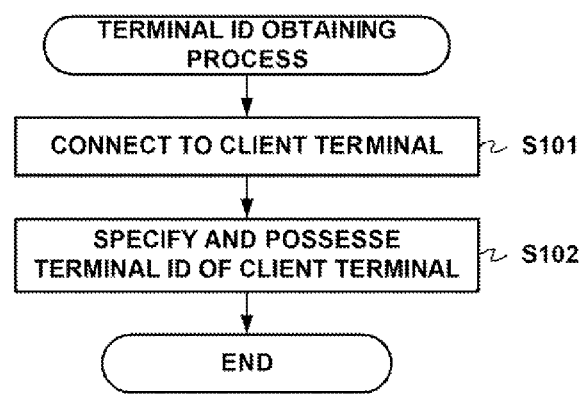
FIG. 5 is a flowchart showing an illustrative operation of a terminal-ID obtaining process by the cellular phone.

The control unit 11 of the cellular phone 1 executes a terminal-ID obtaining process shown in FIG. 5 at a predetermined cycle.

In the terminal-ID obtaining process, first, the control unit 11 runs the program for realizing the access point function of the wireless LAN and is connected to a client terminal through the wireless LAN using the wireless communicating unit 15 (step S101).

The term "client terminal" is the cellular phone 2, or the cellular phone 3, etc., which is located around the cellular phone 1. It is presumed that a communication range through the wireless communicating unit 15 is a relatively close range like several meters.

Subsequently, the control unit 11 identifies a terminal ID (e.g., a MAC address) of the client terminal connected in the step 101 and holds that specified terminal ID in a predetermined area of the memory unit 12 (step S102).

The terminal ID held in the memory unit 12 is sequentially updated because the terminal-ID obtaining process is executed at the predetermined cycle. Consequently, the terminal ID of the client terminal (the cellular phone) located around the cellular phone 1 when the terminal-ID obtaining process is executed is held in the memory unit 12.

Although the cellular phone 2 and the cellular phone 3 are shown as the client terminals in the example case of FIG. 1, there may be an additional client terminal. When there is an additional client terminal, the terminal ID of that client terminal is also held in the memory unit 12.

The control unit 11 terminates the terminal-ID obtaining process after the process of the step S102.

When image data is picked up by the image-pickup unit 46, the digital camera 4 sends that image data to the cellular phone 1. Such a function of the digital camera 4 is executed when, for example, a setting is made to the digital camera 4 so as to utilize a function of the image display system 100. For example, if the network address of the cellular phone 1 in the wireless LAN is set in the memory unit 42 of the digital camera 4 or the like, the digital camera 4 can send the image data to the cellular phone 1 through the wireless LAN.

The cellular phone 1 stores the image data sent by the digital camera 4 in the memory unit 12. Consequently, the control unit 11 of the cellular phone 1 executes an image storing process shown in FIG. 6 at a predetermined cycle in which image data sent by the digital camera 4 is detectable.

In the image storing process, the control unit 11 determines whether or not the control unit receives image data from the digital camera 4 (step S201). At this time, the control unit 11 is connected to the digital camera 4 through the wireless LAN using the wireless communicating unit 15. It is also presumed that, as well as the case of the step S101 shown in FIG. 5, the communication range through the wireless communicating unit 15 is a relatively close range like several meters.

When no image data is received from the digital camera 4 (step S201: No), the control unit 11 terminates the image storing process.

When the image data is received from the digital camera 4 (step S201: Yes), the control unit 11 stores, in the predetermined area of the memory unit 12, that image data in association with the terminal ID which is sequentially updated through the foregoing terminal-ID obtaining process shown in FIG. 5 and which is held in the memory unit 12 (step S202). The image data may be stored further in association with the terminal ID of the cellular phone 1.

Thereafter, the control unit 11 terminates the image storing process.

In this image storing process, the image data picked up by the digital camera 4 is stored in association with the terminal ID of the client terminal located relatively close to the cellular phone 1 that functions as the wireless LAN access point. This is because that the image data highly possibly contains the image of the user of the client terminal located close to the digital camera 4 when the image data is picked up. That is, the image data and the identification information of the user who is a highly possibly appearing in that image data are stored in association with each other. Consequently, the foregoing communication range explained as the relatively close range is a range having a high possibility that the user appears in the image data. Such a range may be settable by a user beforehand.

Subsequently, an image display process for displaying the image data stored through the image storing process shown in FIG. 6 will be explained. It is appropriate if the image display process shown in FIG. 7 is executed at a predetermined timing after the image data is stored through the image storing process. The image display process may be executed in response to, for example, a predetermined operation given to the operating unit 13 of the cellular phone 1.

In the image display process, first, the control unit 11 is connected to the client terminal through the wireless LAN using the wireless communicating unit 15 (step S301). Next, the control unit 11 specifies the terminal ID of the connected client terminal (step S302).

Subsequently, the control unit 11 compares the terminal ID specified in the step S302 with the terminal ID associated with the image data in the memory unit 12, and determines whether or not there is image data having a matching terminal ID in the memory unit 12 (step S303). This matching may be a partial matching or an exact matching. When there is no image data having a matching terminal ID (step S303: No), the control unit 11 terminates the image display process.

When there is image data having a matching terminal ID (step S303: Yes), the control unit 11 sends that image data to the digital photo frame 5, and controls the digital photo frame 5 to display that image data (step S304). Thereafter, the control unit 11 terminates the image display process. When there are plural pieces of image data having a matching terminal ID, the control unit 11 may cause the plural pieces of image data to be displayed in a slide-show manner.

As explained above, in the image display process, the client terminal located in the vicinity of the cellular phone 1 (the user possessing that client terminal) is determined at a timing differing from the timing of storing the image data in the memory unit 12, and the digital photo frame 5 displays image data having a high possibility that the user appears therein. This results in significant reduction of an operation and a time for searching desired image data (e.g., image data in which a person searching the image data and a person near that person appear).

The present invention is not limited to the forgoing embodiment, and can be changed and modified in various forms. Although the explanation was given of an example case in which image data picked up by the digital camera 4 is displayed in the forgoing embodiment, image data picked up by the cellular phone 1 may be displayed. In this case, the digital camera 4 becomes unnecessary in the image display system 100.

Moreover, in the foregoing embodiment, the image data picked up by the digital camera 4 is stored in the memory unit 12 of the cellular phone 1 in association with the terminal ID, the image data may be stored in the memory unit 42 of the digital camera 4.

Furthermore, the digital photo frame 5 displays image data in the foregoing embodiment, such a device is not limited to any particular one as long as it has a display function of digital data. Other devices, such as a TV, a monitor, and a predetermined terminal device like a cellular phone may have a display screen displaying image data.

Still further, although the explanation was given of an example case in which image data (a still image) is displayed in the forgoing embodiment, video data (a motion image) and music may be played instead of image data.

In the forgoing embodiment, although the cellular phone 1 as a mobile terminal device is equipped with the functions shown in the flowcharts of FIGS. 5 to 7, the device having such a function may be an exclusive device, and such a device having such a function may be mounted in a vehicle or the like.

In the foregoing embodiment, although the explanation was given of a case in which the program executed by the control unit is stored in the memory unit beforehand, the program may be stored in the memory unit through an external memory medium or a communication network.

For example, in the foregoing embodiment, the program stored in the memory unit 12 of the cellular phone 1 may be stored in a computer-readable storage medium, such as a flexible disc, a CD-ROM (Compact Disk Read-Only Memory), a DVD (Digital Versatile Disk), or an MO (Magneto-Optical disk), and distributed, and installed in a computer in order to embody a device that realizes the above-explained function.

Moreover, the program may be stored in the disk device or the like of a predetermined device over a communication network like the Internet beforehand, and may be superimposed on a carrier wave so as to allow a computer to download such a program.

Furthermore, the above-explained functions can be realized by launching and executing the program while transferring the program through a communication network.

Still further, the above-explained function can be realized by executing the whole or a part of the program on a server device and by executing the program while a computer exchanges information on the process by the server device through a communication network.

When the above-explained function is beard by an OS (Operating System) or when the OS and an application cooperatively work together to realize the above-explained function, portions other than the OS may be stored in a medium and distributed, and may be downloaded in a computer.

Next, a functional configuration of the cellular phone 1 that operates as the wireless LAN access point will be explained. Hereinafter, the cellular phone 1 that functions as the wireless LAN access point may be referred to as a main cellular phone in order to be distinguished from the other cellular phones 2, 3.

FIG. 8 is a block diagram showing an illustrative functional configuration of the cellular phone 1. In FIG. 8, the same structural element as one already explained will be denoted by the same reference numeral and the duplicated explanation thereof will be omitted.

As shown in FIG. 8, the cellular phone 1 includes the wireless communicating unit 15, an identification information obtaining unit 101, an image data obtaining unit 102, a first identification information obtaining control unit 103, an image data memory unit 104, a second identification information obtaining control unit 105, a searching unit 106, and a display control unit 107. The identification information obtaining unit 101, the image data obtaining unit 102, the first identification information obtaining control unit 103, the image data memory unit 104, the second identification information obtaining control unit 105, the searching unit 106, and the display control unit 107 are functional configurations realized by the operation of the control unit 11 of the cellular phone 1.

The wireless communicating unit 15 is the wireless communicating unit shown in FIG. 2 and wirelessly communicates with at least a device. Such a device includes the other cellular phones like the cellular phones 2, 3, the digital camera 4, and the digital photo frame 5.

The cellular phone 1 communicates with a device located around the cellular phone 1 through the wireless LAN using the wireless communicating unit 15. The cellular phone 1 that is the main cellular phone makes a connection setting relating to a wireless LAN with another device. For example, the cellular phone 1 adjusts a wireless output so that the reachable range of wireless LAN electric waves becomes within several meters. The wireless LAN communication range is limited through this adjustment, and a device located relatively close to the cellular phone 1 is connected to the cellular phone 1 through the wireless LAN. The wireless LAN setting information adjusted thus way is stored in, for example, the memory unit 12 beforehand.

The identification information obtaining unit 101 obtains the identification information of the device wirelessly communicated through the wireless communicating unit 15.

The image data obtaining unit 102 obtains image data picked up by the digital camera 4 that is an image-pickup device among the devices wirelessly communicated through the wireless communicating unit 15. The image data obtaining unit 102 may pick up an image of an object using the image-pickup unit 16 of the cellular phone 1 and obtain image data.

The first identification information obtaining control unit 103 causes the identification information obtaining unit 101 to obtain identification information when the image data obtaining unit 102 obtains image data. More specifically, when receiving a signal indicating that image data is obtained from the image data obtaining unit 102, the first identification information obtaining control unit 103 sends a signal to the identification information obtaining unit 101 that instructs to obtain identification information. Consequently, when the digital camera 4 within the wireless LAN communication range of the cellular phone 1 picks up an image, the cellular phone 1 obtains a terminal ID that is the identification information of another cellular phone within the wireless LAN communication range of the cellular phone 1.

The image data memory unit 104 stores the image data obtained by the image data obtaining unit 102 and the identification information obtained by the control of the first identification information obtaining control unit 103 when that image data is obtained in association with each other. The function of the image data memory unit 104 is realized by the control unit 11 and the memory unit 12. More specifically, the control unit 11 stores the image data obtained by the image data obtaining unit 102 and the identification information obtained by the identification information obtaining unit 101 under the control of the first identification information obtaining control unit 103 in the memory unit 12 in association with each other.

The image data and the identification information associated with each other may be stored in the memory area of the digital camera 4.

FIG. 9 is a diagram showing an illustrative data structure of the image data memory unit 104 that stores image data and identification information in association with each other.

As shown in FIG. 9, in the image data memory unit 104, image data picked up by the digital camera 4 is stored in association with a terminal ID that is the identification information of a cellular phone located within the wireless LAN communication range of the cellular phone 1 when the image data is picked up.

The second identification information obtaining control unit 105 causes the identification information obtaining unit 101 to obtain identification information at a predetermined timing after the image data memory unit 104 stores the image data and the identification information in association with each other. For example, when a user operates the operating unit 13 in order to give an instruction to search the image data stored in the image data memory unit 104, the second identification information obtaining control unit 105 sends a signal for instructing obtaining of the identification information to the identification information obtaining unit 101 at a timing at which that operation is given. Consequently, when a searching is instructed, the cellular phone 1 obtains a terminal ID that is the identification information of another cellular phone located within the wireless LAN communication range of the cellular phone 1.

The searching unit 106 searches image data that is associated with identification information obtained under the control of the second identification information obtaining control unit 105 among pieces of image data stored in the image data memory unit 104. More specifically, when receiving identification information obtained under the control of the second identification information obtaining control unit 105, the searching unit 106 compares the received identification information and the identification information that is associated with the image data stored in the image data memory unit 104. Thereafter, the searching unit 106 reads the image data that is associated with the identification information received from the identification information obtaining unit 101 from the image data memory unit 104.

For example, when the image data memory unit 104 stores information exemplified in FIG. 9, if there is cellular phones having respective terminal IDs which are "1002" and "1003" within the wireless LAN communication range of the cellular phone 1 at the time of searching, the searching unit 106 reads an image B and an image D which are associated with respective terminal IDs "1002" and "1003" from the image data memory unit 104.

The display control unit 107 displays the image data searched by the searching unit 106 on the display unit 14. According to such a display, among plural pieces of image data stored in the image data memory unit 104, only image data having a high possibility that the person having another cellular phone located in the vicinity of the cellular phone 1 at the time of searching appears in that image data is displayed, and images unrelated to the person near the user of the cellular phone 1 is not displayed.

When image data is displayed on the display unit 14 as explained above, the image display system 100 exemplified in FIG. 1 may have no digital photo frame 5. The cellular phone 1 is connected to at least another cellular phone and the digital camera 4 through a wireless communication.

Moreover, the display control unit 107 may send image data to the digital photo frame 5 that is a display device among devices wirelessly communicated through the wireless communicating unit 15, and may display the image data on the digital photo frame 5. In this case, the cellular phone 1 is connected to the digital photo frame 5 through a wireless communication, and the image data is displayed on the display unit 54 of the digital photo frame 5.

In the image display system 100 including the cellular phone 1 having the above-explained functional configuration, when the digital camera 4 present within a predetermined range of the cellular phone 1 picks up an image, the cellular phone 1 that is the main cellular phone obtains image data from the digital camera 4 through a wireless communication. Upon obtaining the image data, the cellular phone 1 obtains the terminal ID of a cellular phone present within the predetermined range of the cellular phone 1 through a wireless communication. The cellular phone 1 stores the obtained image data and the terminal ID obtained at the time of obtaining the image data in the memory unit 12 in association with each other. Subsequently, the cellular phone 1 receives an input of an instruction of searching image data given by a user, and when the search instruction is input, obtains the terminal ID of a cellular phone that is present within the predetermined range of the cellular phone 1 at that time through a wireless communication. Thereafter, the cellular phone 1 extracts image data associated with the terminal ID obtained when the search instruction is input among pieces of the image data stored in the memory unit 12.

Consequently, according to the image display system 100 of the present embodiment, the user can extract image data having a high possibility that the person having a cellular phone located near the cellular phone 1 appears among plural pieces of the image data, and can easily search a desired image among all picked-up images.

This application is the National Phase of PCT/JP2009/069955, filed Nov. 26, 2009, which claims the priority base on Japanese Patent Application No. 2008-300539 filed on Nov. 26, 2008, which includes a specification, claims, drawings and an abstract. The disclosure of Japanese Patent Application No. 2008-300539 is entirely incorporated herein by reference in this specification.

The present invention can be changed and modified in various embodiments and forms without departing from the scope and the spirit of the present invention. The foregoing embodiment is provided to give explanations of the present invention, not to limit the scope of the present invention. That is, the scope of the present invention is indicated not by the embodiment but by the appended claims. Various changes and modifications embodied in the claims and equivalencies of the present invention are within the scope of the present invention.

DESCRIPTION OF REFERENCE NUMERALS 1 to 3 Cellular phone
4 Digital camera
5 Digital photo frame
11, 41, 51 Control unit
12, 42, 52 Memory unit
13, 43, 53 Operating unit
14, 44, 54 Display unit
15, 45, 55 Wireless communicating unit
16, 46 Image-pickup unit
17 Sound outputting unit
18 Sound inputting unit
19 Cellular-phone-network communicating unit
20, 47, 56 Bus
100 Image display system
101 Identification information obtaining unit
102 Image data obtaining unit
103 First identification information obtaining control unit
104 Image data memory unit
105 Second identification information obtaining control unit
106 Searching unit
107 Display control unit

The invention claimed is:

1. A portable terminal device comprising:
a wireless communicating unit that wirelessly communicates with at least a device;
an identification information obtaining unit that obtains identification information of the device wirelessly communicated with the wireless communicating unit;
an image data obtaining unit that obtains image data picked up by an image-pickup device among devices wirelessly communicated with the wireless communicating unit;
a first identification information obtaining control unit that causes the identification information obtaining unit to obtain the identification information when the image data is obtained by the image data obtaining unit;
an image data memory unit that stores, in association with each other, the image data obtained by the image data obtaining unit and the identification information obtained under a control of the first identification information obtaining control unit when the image data is obtained;
a second identification information obtaining control unit that causes the identification information obtaining unit to obtain the identification information at a predetermined timing after the image data memory unit stores the image data and the identification information in association with each other;
a searching unit that searches image data associated with the identification information obtained under a control of the second identification information obtaining control unit among pieces of the image data stored in the image data memory unit; and
a display control unit that displays the image data searched by the searching unit on a display unit.

2. The portable terminal device according to claim 1, wherein
a display device among the devices wirelessly communicated with the wireless communicating unit includes the display unit, and
the display control unit sends the image data to the display device, and causes the display device to display the image data.

3. The portable terminal device according to claim 1, further comprising operating unit that receives an operation given by a user,
wherein the second identification information obtaining control unit causes the identification information obtaining unit to obtain the identification information at a timing at which a predetermined operation is given to the operating unit.

4. A portable terminal device comprising:
a wireless communicating unit that wirelessly communicates with at least a device;
an identification information obtaining unit that obtains identification information of the device wirelessly communicated with the wireless communicating unit;
an image data obtaining unit that obtains image data by picking up an image of an object;
a first identification information obtaining control unit that causes the identification information obtaining unit to obtain the identification information when the image data is obtained by the image data obtaining unit;
an image data memory unit that stores, in association with each other, the image data obtained by the image data obtaining unit and the identification information obtained under a control of the first identification information obtaining control unit when the image data is obtained;
a second identification information obtaining control unit that causes the identification information obtaining unit to obtain the identification information at a predetermined timing after the image data memory unit stores the image data and the identification information in association with each other;
a searching unit that searches image data associated with the identification information obtained under a control of the second identification information obtaining control unit among pieces of the image data stored in the image data memory unit; and
a display control unit that displays the image data searched by the searching unit on a display unit.

5. An image display system including a plurality of portable terminal devices and a digital camera, a main portable terminal device that is a portable terminal device among the plurality of portable terminal devices being connected to at least one of the other portable terminal devices and the digital camera through a wireless communication, wherein
the main portable terminal device comprising:
a wireless communicating unit that wirelessly communicates with at least one of the other portable terminal devices and the digital camera;

an identification information obtaining unit that obtains identification information of the portable terminal device wirelessly communicated with the wireless communicating unit;

an image data obtaining unit that obtains image data picked up by the digital camera wirelessly communicated with the wireless communicating unit;

a first identification information obtaining control unit that causes the identification information obtaining unit to obtain the identification information when the image data is obtained by the image data obtaining unit;

an image data memory unit that stores, in association with each other, the image data obtained by the image data obtaining unit and the identification information obtained under a control of the first identification information obtaining control unit when the image data is obtained;

a second identification information obtaining control unit that causes the identification information obtaining unit to obtain the identification information at a predetermined timing after the image data memory unit stores the image data and the identification information in association with each other;

a searching unit that searches image data associated with the identification information obtained under a control of the second identification information obtaining control unit among pieces of the image data stored in the image data memory unit; and a display control unit that displays the image data searched by the searching unit on a display unit.

6. The image display system according to claim 5, further comprising a digital photo frame connected to the main portable terminal device through a wireless communication, wherein the digital photo frame includes the display unit, and a display control unit of the main portable terminal device sends the image data to the digital photo frame, and causes the digital photo frame to display the image data.

7. The image display system according to claim 5, wherein the image data and the identification information which are stored in the image data memory unit of the main portable terminal device in association with each other are stored in a memory area of the digital camera.

8. An image display method including:

an image data obtaining step in which a portable terminal device obtains image data picked up by an image-pickup device among devices connected to the portable terminal device through a wireless communication;

a first identification information obtaining step in which the portable terminal device obtains identification information of a device connected to the portable terminal device through a wireless communication when the image data is obtained in the image data obtaining step;

an image data recording step in which the portable terminal device stores, in a memory unit in association with each other, the image data obtained in the image data obtaining step and the identification information obtained in the first identification information obtaining step when the image data is obtained;

a second identification information obtaining step in which the portable terminal device obtains the identification information of a device connected to the portable terminal device through a wireless communication at a predetermined timing after the image data and the identification information are stored in the memory unit in association with each other in the image data memory step;

a searching step in which the portable terminal device searches image data associated with the identification information obtained in the second identification information obtaining step among pieces of the image data stored in the memory unit in the image data memory step; and a display control step in which the portable terminal device causes a display unit to display image data searched in the searching step.

9. A computer-readable storage medium that stores a program for allowing a computer to function as:

a wireless communicating unit that wirelessly communicates with at least a device;

an identification information obtaining unit that obtains identification information of the device wirelessly communicated with the wireless communicating unit;

an image data obtaining unit that obtains image data picked up by an image-pickup device among devices wirelessly communicated with the wireless communicating unit;

a first identification information obtaining control unit that causes the identification information obtaining unit to obtain the identification information when the image data is obtained by the image data obtaining unit;

an image data memory unit that stores, in association with each other, the image data obtained by the image data obtaining unit and the identification information obtained under a control of the first identification information obtaining control unit when the image data is obtained;

a second identification information obtaining control unit that causes the identification information obtaining unit to obtain the identification information at a predetermined timing after the image data memory unit stores the image data and the identification information in association with each other;

a searching unit that searches image data associated with the identification information obtained under a control of the second identification information obtaining control unit among pieces of the image data stored in the image data memory unit; and a display control unit that causes a display unit to display the image data searched by the searching unit.

* * * * *